INVENTOR
URS GIGER

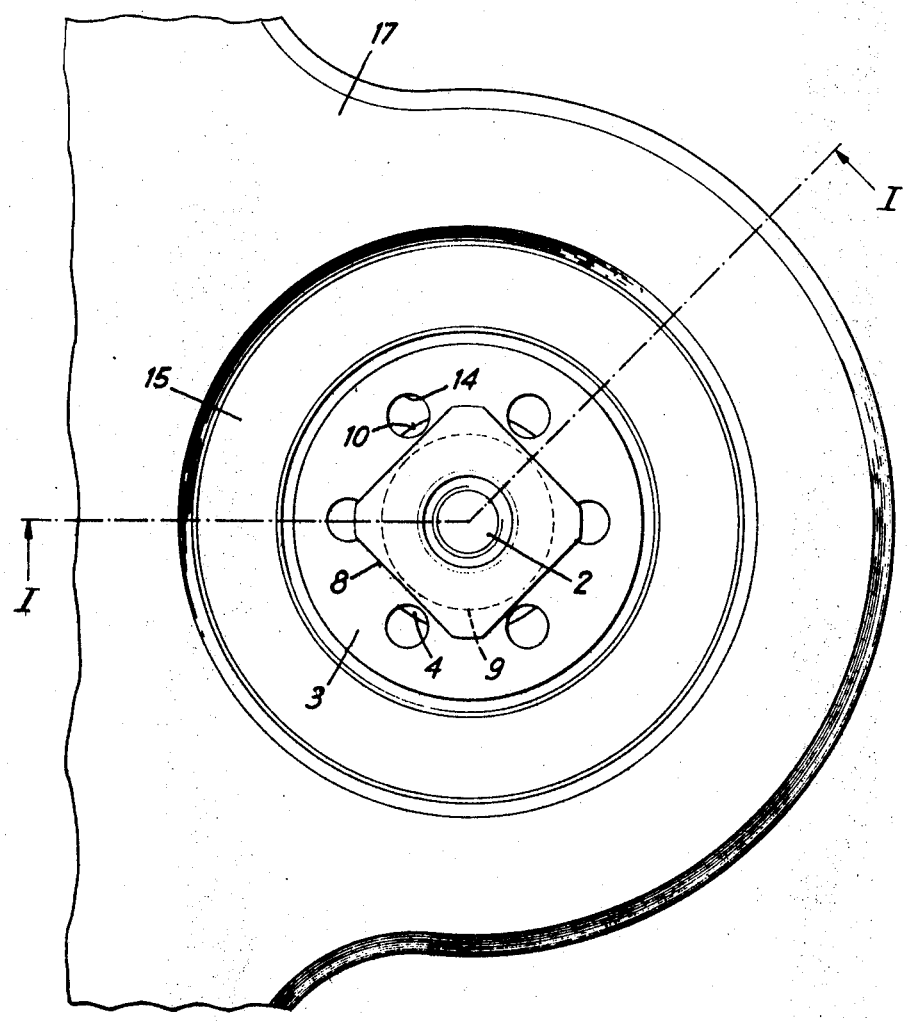

United States Patent Office 3,517,500
Patented June 30, 1970

3,517,500
FRICTIONAL BEARING ARRANGEMENT FOR THE WINDING WEIGHT IN A SELF-WINDING WATCH
Urs Giger, Solothurn, Switzerland, assignor to Eta A. G. Ebauches-Fabrik, Grenchen, Soleure, Switzerland
Filed Jan. 14, 1969, Ser. No. 791,104
Claims priority, application Switzerland, Jan. 30, 1968,
1,374/68
Int. Cl. G04b 5/02, 31/00
U.S. Cl. 58—82                                                6 Claims

ABSTRACT OF THE DISCLOSURE

The bearing part movable with the winding weight and subjected to friction is a flat ring which two fixed outer rings axially hold in place around a fixed middle ring. The three fixed rings are set with force fit on a common sleeve which holds all the parts of the bearing together when the winding weight is removed from the watch movement. In the assembled condition the fixing screw of the weight strongly clamps the set of the three fixed rings.

BACKGROUND OF THE INVENTION

Field of the invention

This invention relates to the bearing arrangements for the winding weight in a self-winding watch and, more particularly, to the frictional bearing arrangements of the type comprising, on the one hand, a flat ring and, on the other hand, a cylindrical surface around which this ring rotates as well as two annular plane surface portions facing each other and holding the rotating ring in a predetermined axial position.

Description of the prior art

The bearing arrangements of the particular type considered here which are known in the art have the advantage that they can easily be manufactured at low costs. Moreover, the adjustment of those bearings does not raise any problem. Finally, the total height of the bearing arrangement is small. In spite of this small size, the known bearings nevertheless hold the winding weight substantially without any free play in axial direction.

However, the known bearing arrangements have a serious drawback. They have to be disassembled every time the winding weight is removed from the watch movement.

SUMMARY OF THE INVENTION

It is therefore one of the main objects of the invention to improve the bearing arrangements of the type indicated above in such manner that they can be removed as a unit together with the winding weight when the latter has itself to be removed from the watch movement.

A more particular object of the invention resides in providing a bearing arrangement in which the flat ring which constitutes the movable bearing part is rigidly secured to the winding weight while the cylindrical surface around which said flat ring rotates as well as the two annular surfaces holding said ring axially in place belong to the fixed bearing part and extend on three further flat rings, respectively, which are superimposed and set with force fit on a common sleeve.

BRIEF DESCRIPTION OF THE DRAWING

Two embodiments of the bearing arrangement improved according to the invention are represented diagrammatically and by way of example in the accompanying drawing.

In the drawing:

FIG. 2 is a corresponding plan view.

DESCRIPTION OF THE PREFERRED EMBODIMENTS

Figure 1:
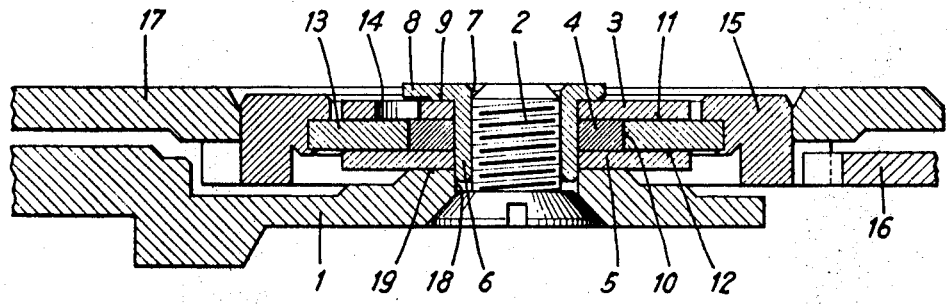
FIG. 1 is a sectional view along line I—I of FIG. 2 of the first embodiment.

The bearing arrangement represented in FIGS. 1 and 2 comprises a fixed bearing part which is removably secured by means of a screw 2 onto a frame part constituting a support 1 for the winding weight. The fixed bearing part comprises three rings 3, 4, 5 which are superimposed on a sleeve 6. The latter has a tapped portion 7 for screw 2 and it is provided with a square flange 8 carrying an annular collet 9 which can be manuafctured, for instance, by lathe-turning the lower surface of flange 8. The rings 3, 4, 5 are set with force fit on sleeve 6 so as to form a unit together with this sleeve. The two outer rings 3 and 5 have the same outer diameter which is greater than that of the middle ring 4. The outer cylindrical surface 10 of this middle ring 4 and the two annular surface portions 11 and 12, which extend on rings 3 and 5, respectively, radially outwards beyond the cylindrical surface 10 and are facing each other, constitute together the bearing surfaces of the fixed bearing part.

The movable part of the bearing arrangement is constituted by a flat ring 13 which is freely pivoted around the middle ring 4. Ring 13 is axially held in place between the two outer rings 3 and 5. In order that ring 13 may freely rotate between the two outer rings, its thickness is somewhat smaller than that of the middle ring 4. The upper ring 3 is provided with a row of bores 14 for the lubrication of the bearing arrangement. For this purpose, the bores 14 give free access to the cylindrical bearing surface 10. Ring 13 is rigidly secured to pinion 15 of the winding weight, which meshes with the first wheel 16 of the self-winding gear train. Pinion 15 is itself rigidly secured to the winding weight 17.

The frame 1 constituting the support of the winding weight is provided with an annular abutting surface 19 being coaxial to bore 18 provided for screw 2. When the winding weight 17 is mounted on frame 1, the set of the three rings 3, 4 and 5 is strongly clamped in axial direction between collet 9 and the abutting surface portion 19. Whichever the overhanging portion of the winding weight 17 may be, the latter cannot move the rings constituting the fixed bearing part away from each other. Before the winding weight 17 is mounted onto the watch movement, it is ring 13 which holds the fixed bearing part. Since the only force to which rings 3, 4 and 5 are then subjected is constituted by the own weight of those rings, the latter in no way risk to be removed from their common sleeve 6.

As clearly shown in FIG. 1 the square flange 8 slightly extends beyond the upper surface of the winding weight 17. This arrangement in combination with the square shape of flange 8 is very helpful when mounting weight 17 onto frame part 1. For that purpose, weight 17 is held with its upper surface turned downwards and lying on a support preferably made out of a relatively soft material. Frame part 1 is then set over winding weight 17 and screw 2 is screwed into the tapped sleeve 6. During the last operation the protruding portion of the square flange 8 is driven into the soft support which thus prevents sleeve 6 from rotating until screw 2 presses the fixed bearing part against the abutting surface 19.

To avoid any deformation of the outer rings 3 and 5 under the clamping action exerted thereon by collet 9 and the abutting surface 19, which could result from any one imprecision in the manufacture of some bearing part and would clamp ring 13, collet 9 and abutting surface 19 are advantageously given outer diameters which are at most equal to that of the middle ring 4.

In the first embodiment the winding weight 17 and its supporting frame part 1 can be handled as a unit during assembling the watch movement. The position of screw 2, which is set from the lower surface of the winding weight 17, has the advantage that a watchmaker who is not familiar with that type of watch movement is not misled and cannot uselessly remove the winding weight 17 from its supporting frame part 1 when he disassembles the watch-movement. The position of screw 2 on the contrary leads the watch-maker to proceed in the right manner with this movement. The essential pieces of the bearing arrangements improved according to the invention, i.e. the four rings 3, 4, 5 and 13 can easily be manufactured by merely cutting-out them from a sheet material previously rolled in the proper manner. These four rings need only have the exact sizes desired in order that the free play of the bearing be automatically adjusted when the bearing is assembled. Although the improved bearing arrangement is extremely flat, it enables journalling the winding weight 17 with an extremely reduced free play in axial direction while permitting this weight to rotate very freely and to wind up the watch movement at the same rate as the winding weights provided with known bearing arrangements of the same type.

Figure 3:
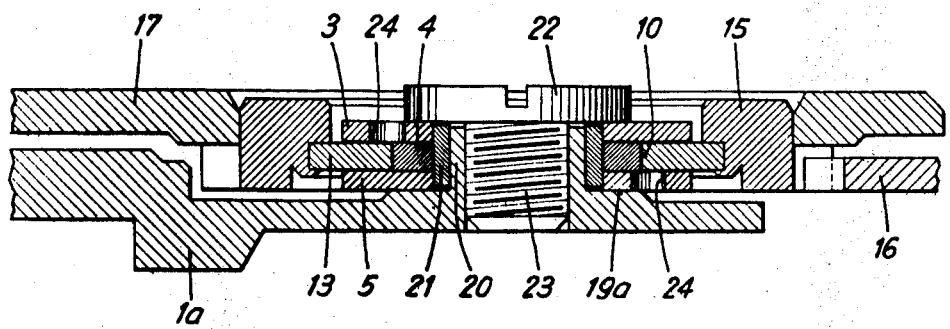
FIG. 3 is a diametrical section of the second embodiment.

The second embodiment of the improved bearing arrangement represented in FIG. 3 only differs from the first embodiment by the means provided for mounting weight 17 on the corresponding frame part. In the second embodiment weight 17 is mounted on frame part 1a while keeping the upper surface of the weight 17 turned upwards. For that purpose frame part 1a is formed with a tapped tubular projection 20. Rings 3, 4, 5 constituting the fixed bearing part are set with force fit onto a sleeve 21 which can be freely shifted onto projection 20. Frame part 1a, moreover, comprises an annular abutting surface 19a surrounding projection 20 and having an outer diameter equal to that of the middle ring 4. In the assembled state the three rings 3, 4, 5 are pressed by the head 22 of the fixing screw 23 onto the abutting surface 19a. For that purpose the heights of projection 20 and sleeve 21, respectively, are smaller than the total thickness of the set constituted by the three superimposed rings 3, 4, 5.

In this second embodiment lubricating bores 24 are provided not only in the upper ring 3, but also in the lower ring 5.

Ring 13 carries the inner fixed bearing part (3, 4, 5, 21) of the bearing arrangement in the same manner as in the first embodiment when the winding weight 17 has been removed from the frame part 1a so that rings 3, 4, 5 in no way risk to be shifted away from one another and from their carrying sleeve 21.

What we claim is:

1. A frictional bearing arrangement for the winding weight in a self-winding watch comprising, in combination, a fixed bearing part including a sleeve and three adjacent flat rings strongly fitted onto said sleeve, the middle ring having an outer cylindrical surface and the two outer rings having diameters larger than said cylindrical surface of the middle ring, two annular plane surface portions facing each other thus extending on said outer rings, radially beyond said cylindrical surface of said middle ring, and a movable bearing part rigidly secured to the winding weight and including a flat ring movable relative to said fixed bearing part, the movable ring smoothly encompassing said cylindrical surface of said middle ring and coming in a smooth frictional engagement with said annular plane surface portions of the outer rings of said fixed bearing part, these annular plane surface portions thus holding said movable ring axially in place.

2. The bearing arrangement according to claim 1, wherein the winding weight is removably mounted on a frame part and further comprising a piece removable from said frame part together with the winding weight, a first abutting surface portion on said piece and a second abutting surface portion on said frame part, said first and said second abutting surface portions facing each other and exerting a strong clamping action in axial direction on the three rings of said fixed bearing part.

3. The bearing arrangement according to claim 2, wherein said first and said second abutting surface portions have outer diameters at most equal to the diameter of said cylindrical surface of the middle ring of said fixed bearing part.

4. The bearing arrangement according to claim 2, further comprising a fixing screw for removably mounting the winding weight onto said frame part, said sleeve of the fixed bearing part consituting said piece removable from said frame part together with the winding weight and being tapped for receiving said fixing screw, said sleeve being moreover provided with a flange extending radially outwards and carrying said first abutting surface portion.

5. The bearing arrangement according to claim 2, further comprising a head screw for removably mounting the winding weight onto said frame part, and a tapped tubular projection on said frame part, which is adapted for receiving both said head screw and said sleeve of the fixed bearing part, this screw constituting said piece removeable together with the winding weight and its head carrying said first abutting surface portion.

6. The bearing arrangement according to laim 1, wherein at least one of the two outer rings of said fixed bearing part is provided with a row of lubricating bores giving a free access to said cylindrical surface of the middle ring of said fixed bearing part.

References Cited
UNITED STATES PATENTS

| | | |
|---|---|---|
| 1,165,594 | 12/1915 | Hani. |
| 2,620,619 | 12/1952 | Meyer. |
| 2,670,591 | 3/1954 | Stamm. |
| 2,686,397 | 8/1954 | Annen. |
| 2,948,573 | 8/1960 | Stamm. |

FOREIGN PATENTS

| | | |
|---|---|---|
| 403,719 | 1909 | France. |
| 378,230 | 7/1964 | Switzerland. |

STEPHEN J. TOMSKY, Primary Examiner

G. H. MILLER, Jr., Assistant Examiner

U.S. Cl. X.R.

58—140